(12) United States Patent
Saberan et al.

(10) Patent No.: US 7,625,005 B2
(45) Date of Patent: Dec. 1, 2009

(54) COLLAPSABLE INFLATABLE CURTAIN MODULE

(75) Inventors: Al A. Saberan, New Baltimore, MI (US); Joseph C. Popek, Shelby Township, MI (US); Ali Emam Bakhsh, Rochester Hills, MI (US); Daniel R. Sutherland, East Pointe, MI (US); Paul A. Bowers, Ray, MI (US); Michael J. White, Jr., Dryden, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 421 days.

(21) Appl. No.: 11/214,653

(22) Filed: Aug. 30, 2005

(65) Prior Publication Data

US 2007/0045999 A1 Mar. 1, 2007

(51) Int. Cl.
B60R 21/26 (2006.01)
(52) U.S. Cl. .................................. 280/730.2
(58) Field of Classification Search ............. 280/730.2, 280/740, 741, 742, 730.1; 285/23, 133.11, 285/179, 223
See application file for complete search history.

(56) References Cited

U.S. PATENT DOCUMENTS

| | | | |
|---|---|---|---|
| 3,804,435 A * | 4/1974 | See et al. | 280/733 |
| 5,788,270 A | 8/1998 | Haland et al. | |
| 5,791,683 A | 8/1998 | Shibata et al. | |
| 6,073,961 A | 6/2000 | Bailey et al. | |
| 6,079,732 A | 6/2000 | Nakajima et al. | |
| 6,113,132 A * | 9/2000 | Saslecov | 280/730.1 |
| 6,199,898 B1 | 3/2001 | Masuda et al. | |
| 6,234,515 B1 | 5/2001 | Iwanaga | |
| 6,279,944 B1 | 8/2001 | Wipasuramonton et al. | |
| 6,428,036 B1 | 8/2002 | Mramor et al. | |
| 6,447,005 B2 | 9/2002 | Alb et al. | |

(Continued)

FOREIGN PATENT DOCUMENTS

DE 19859539 6/2000

(Continued)

OTHER PUBLICATIONS

Co-pending U.S. Appl. No. 10/090,198, filed Mar. 4, 2002 entitled "Vehicle Interior Lining Assembly".

*Primary Examiner*—Paul N Dickson
*Assistant Examiner*—Robert A Coker
(74) *Attorney, Agent, or Firm*—Tarolli, Sundheim, Covell & Tummino LLP

(57) ABSTRACT

An apparatus (10) for helping to protect an occupant of a vehicle (12) includes at least one inflatable vehicle occupant protection device (14) including a first portion (50) inflatable to cover a first portion (20) of a vehicle and a second portion (52) inflatable to cover a second portion (30) of a vehicle. A single inflator (70) provides inflation fluid to inflate the protection device (14). A first conduit (52) has a portion terminating in the first portion (50) of the protection device (14). A second conduit (62) has a portion terminating in the second portion (60) of the protection device (14). The first and second conduits (52 and 62) are adapted to move relative to each other from a first condition in which the conduits are positioned for installation in the vehicle (12) to a second condition in which the conduits are positioned next to each other.

24 Claims, 6 Drawing Sheets

U.S. PATENT DOCUMENTS

| | | | |
|---|---|---|---|
| 6,595,546 B2 * | 7/2003 | Smith | 280/736 |
| 6,609,726 B1 | 8/2003 | Stutz et al. | |
| 7,125,038 B2 * | 10/2006 | Gammill | 280/728.2 |
| 2004/0239083 A1 * | 12/2004 | Mori et al. | 280/730.1 |

FOREIGN PATENT DOCUMENTS

| | | |
|---|---|---|
| GB | 2314300 | 12/1997 |

* cited by examiner

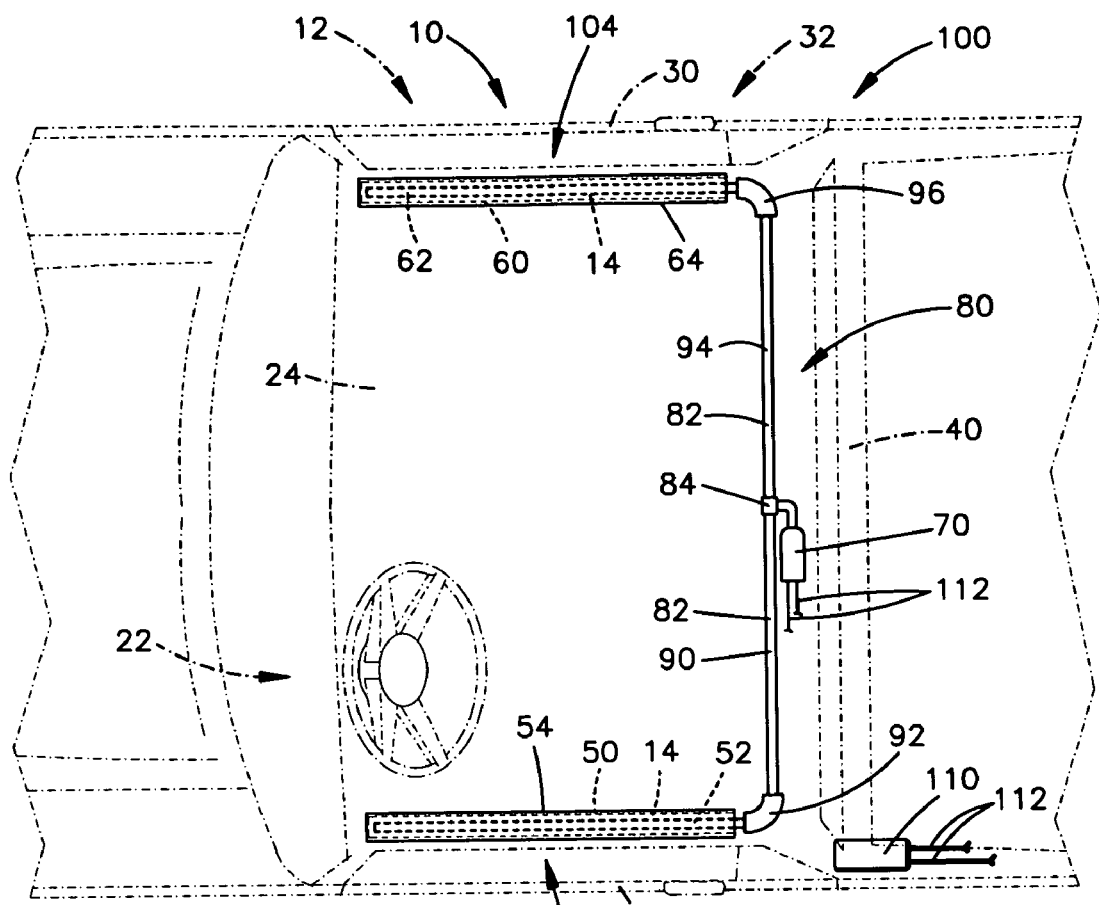
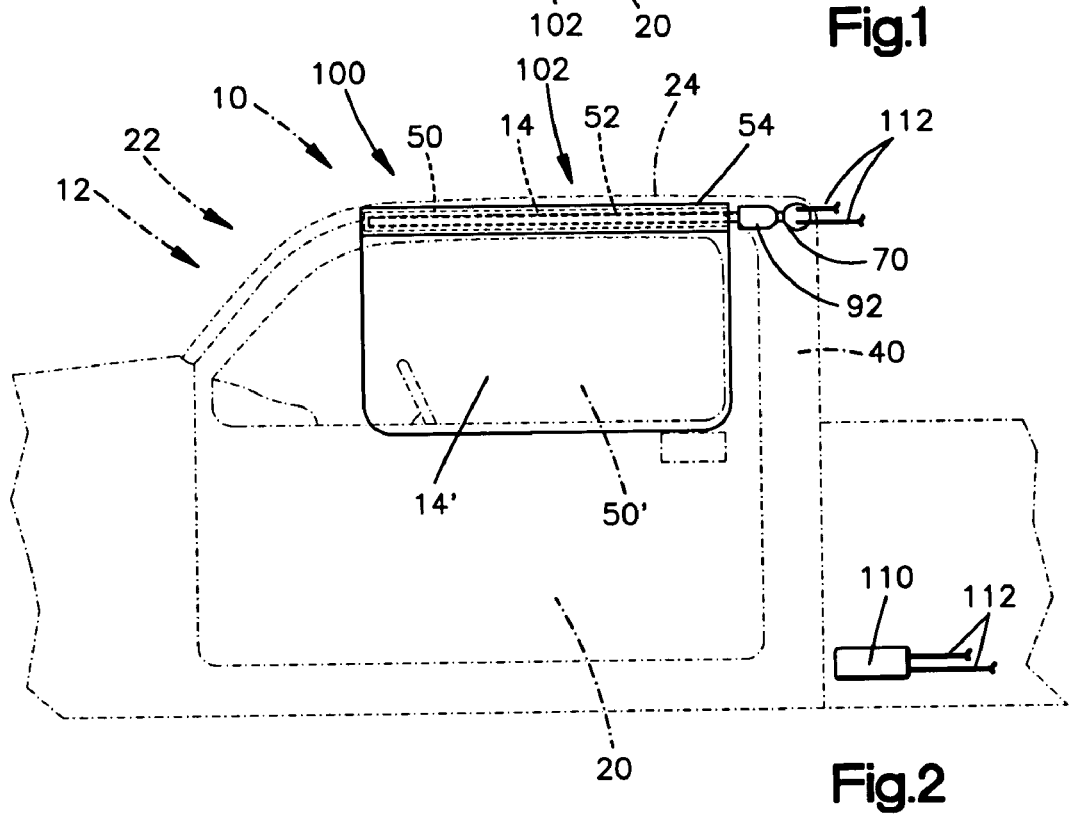

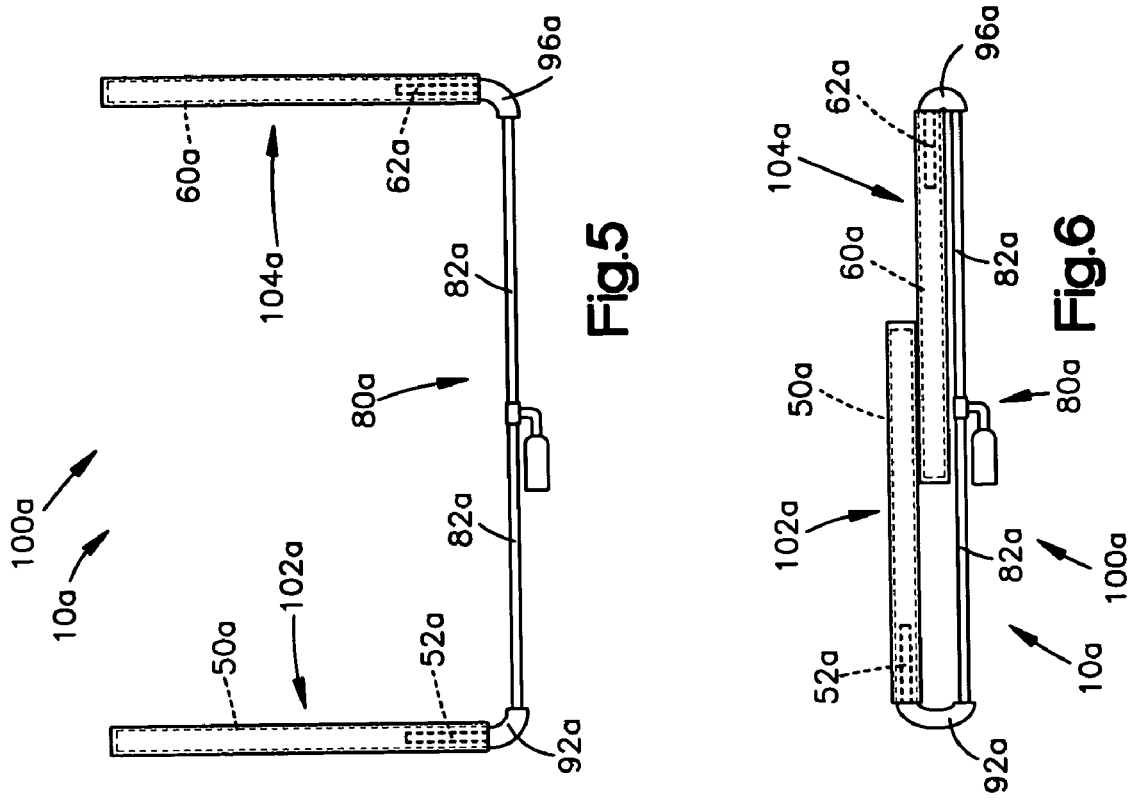
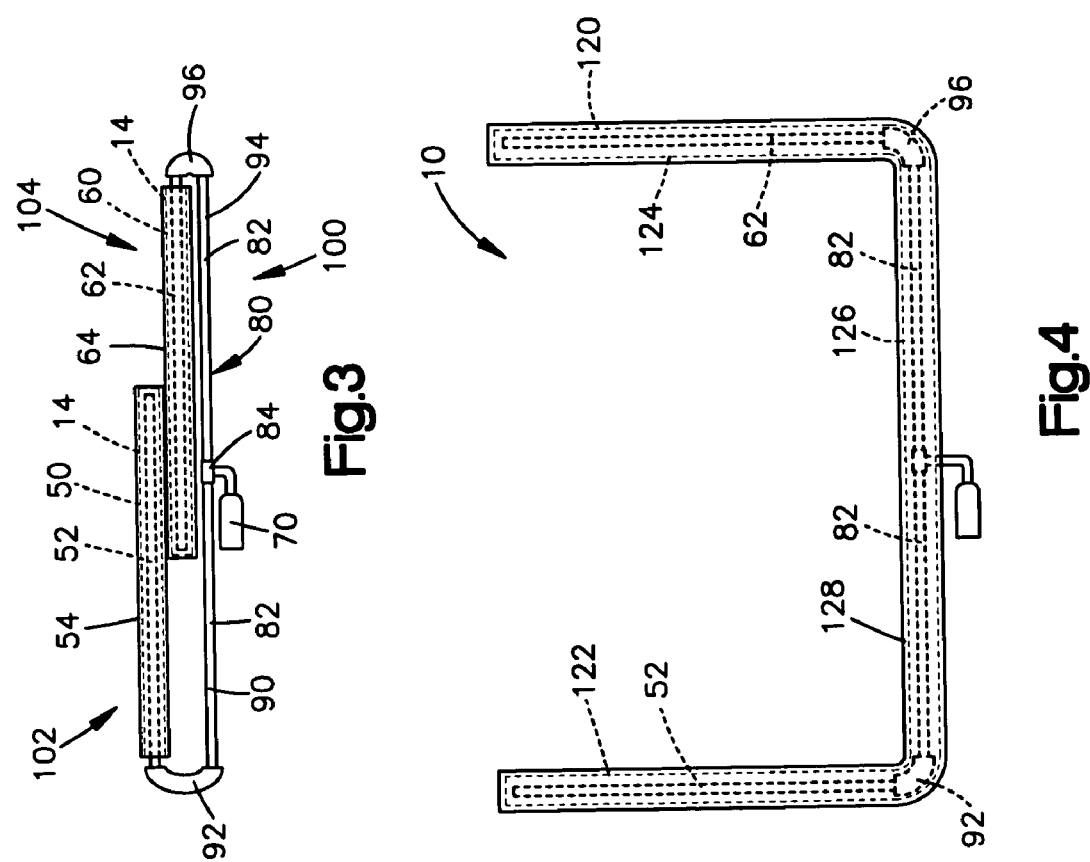

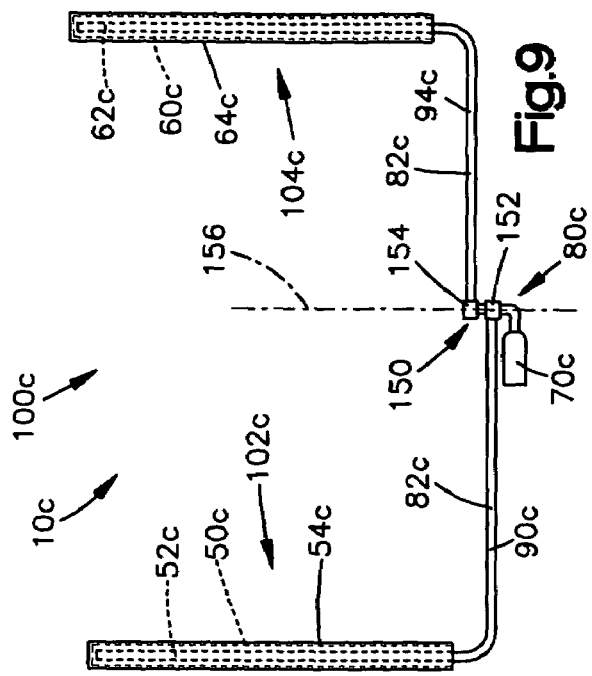
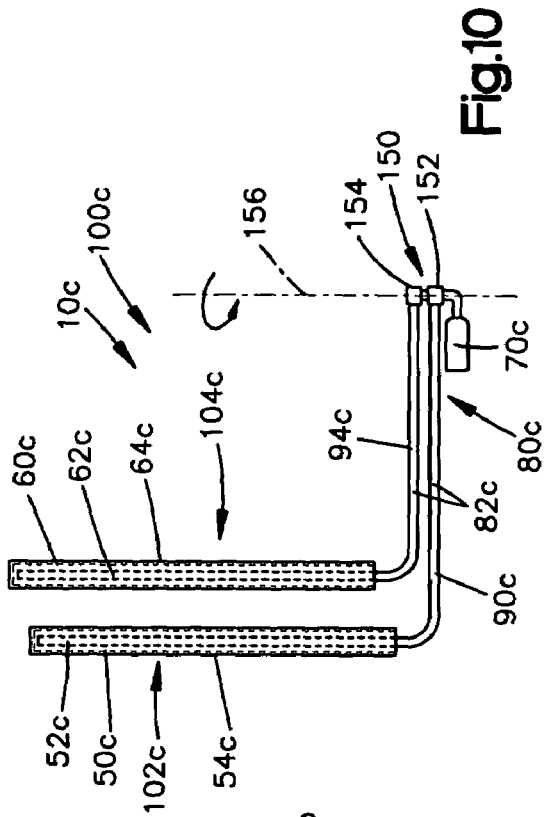
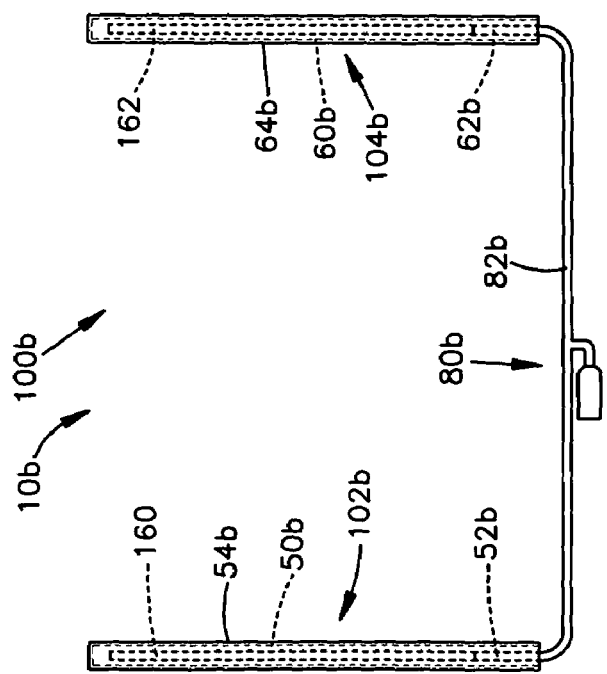
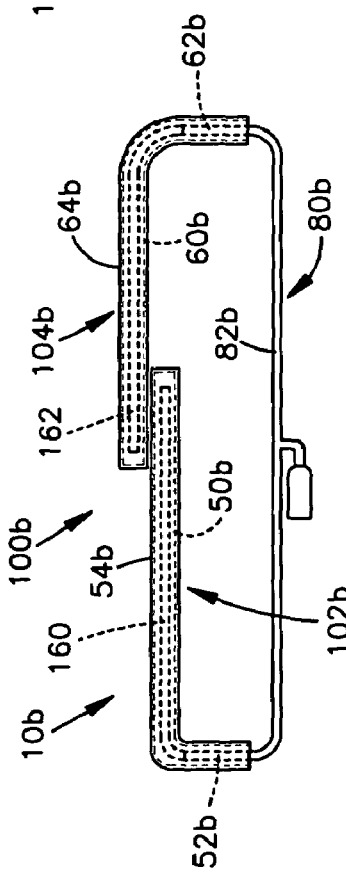

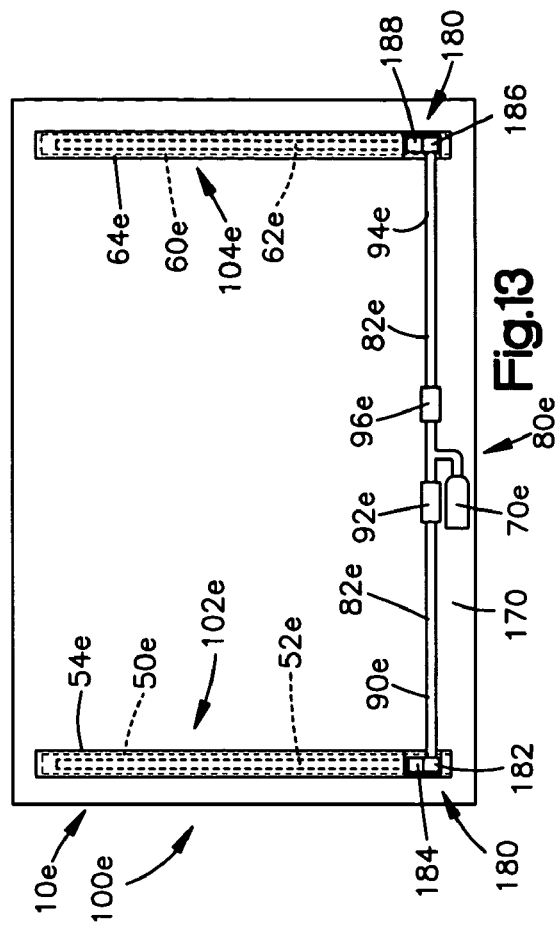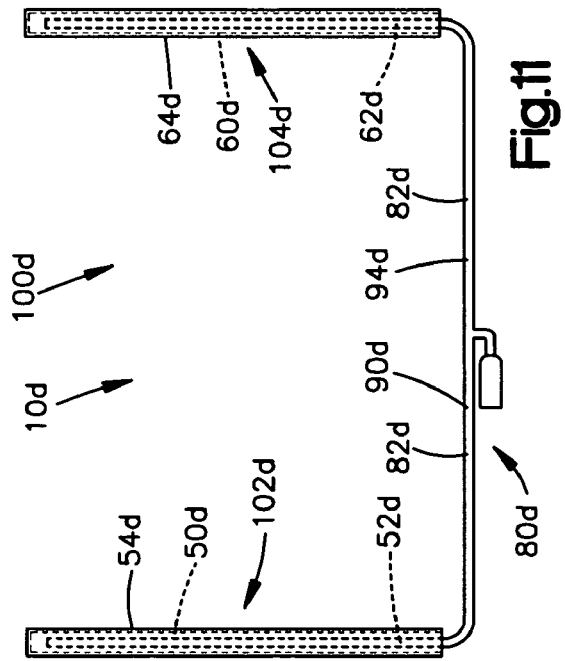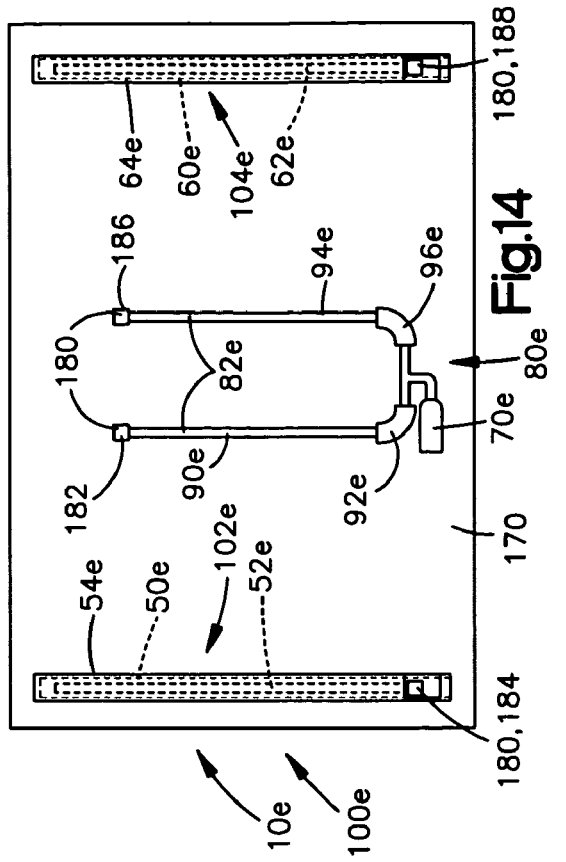

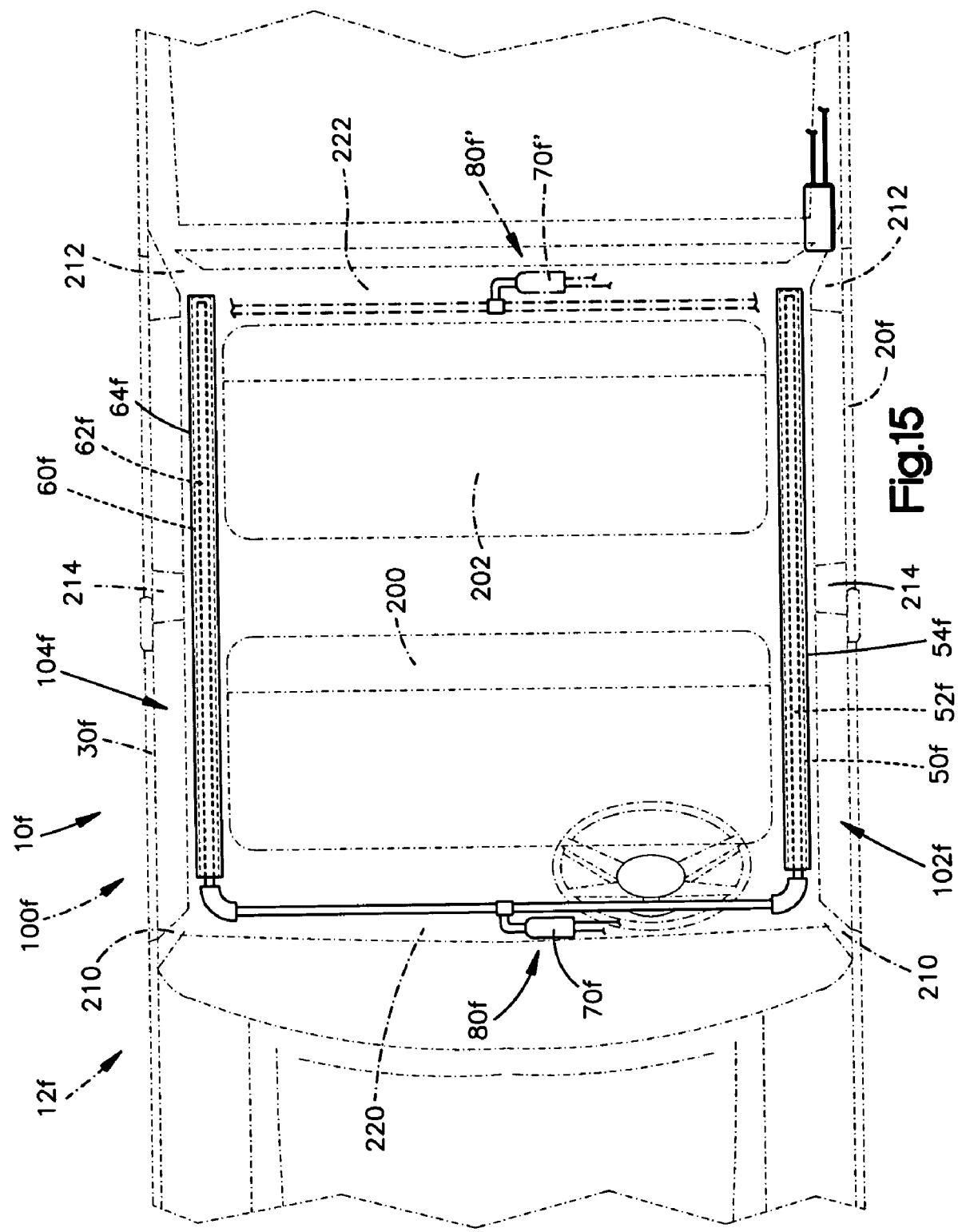

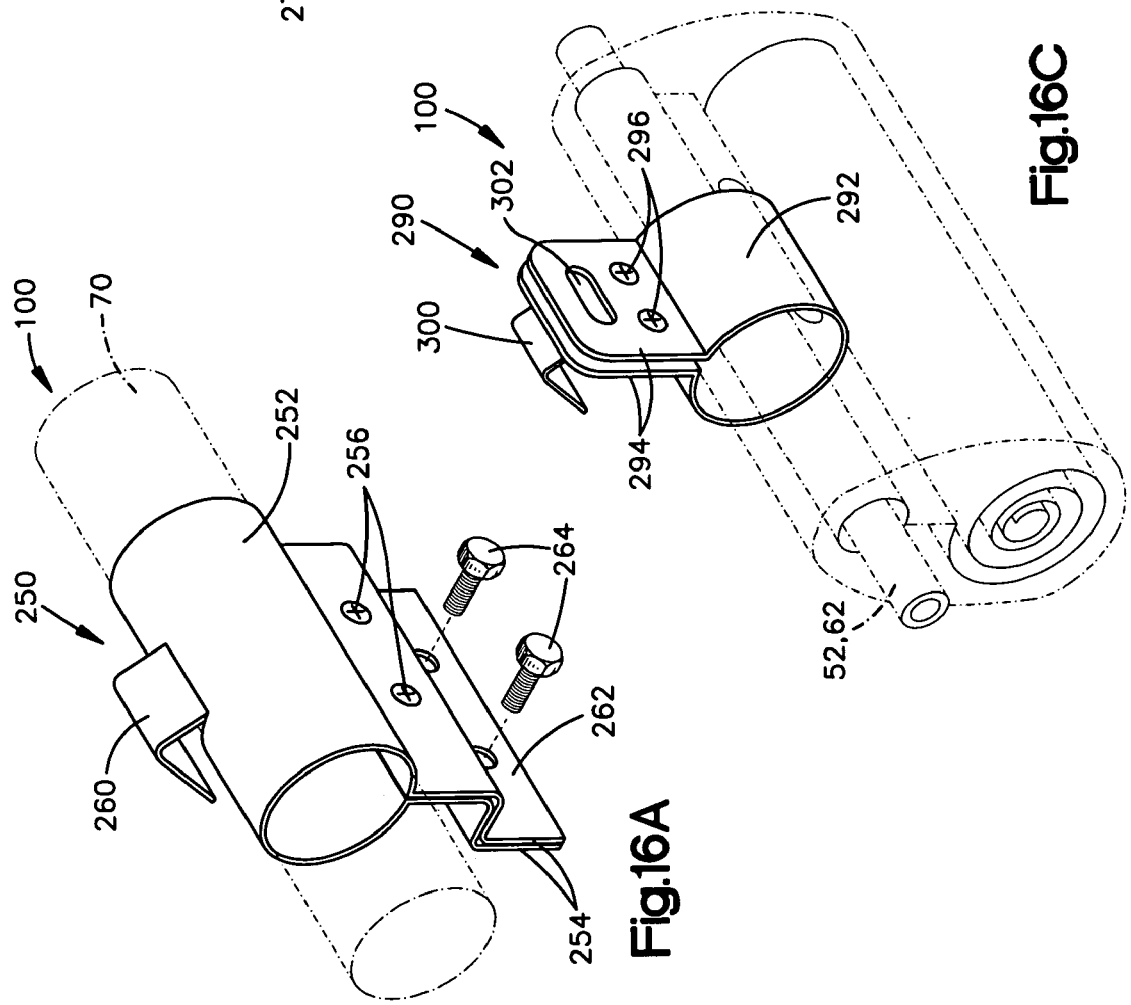

COLLAPSABLE INFLATABLE CURTAIN MODULE

TECHNICAL FIELD

The present invention relates to an inflatable vehicle occupant protection device. More particularly, the present invention relates to an inflatable curtain module that can be collapsed or folded to form a small package size for shipping or handling prior to installation in a vehicle.

BACKGROUND OF THE INVENTION

It is known to inflate an inflatable vehicle occupant protection device to help protect a vehicle occupant. One particular type of inflatable vehicle occupant protection device is an inflatable curtain. An inflatable curtain is inflatable away from the roof of the vehicle and into a position between a vehicle occupant and the side structure of the vehicle.

It is also known to use a fill tube to direct inflation fluid from an inflator to an inflatable curtain. A fill tube typically is an elongated conduit having one end connected to a fluid outlet of the inflator and an opposite end located in the inflatable curtain. The fill tube includes multiple exit ports that are spaced from one another along a length of the fill tube. Inflation fluid exiting the fill tube through the exit ports enters the inflatable curtain to inflate the curtain.

An inflatable vehicle occupant protection device, such as an inflatable curtain, may form a part of an assemblage or module that is shipped to a vehicle manufacturer for installation in a vehicle as a single unit. The module may include the inflatable curtain, the fill tube, and the inflator, or any combination of those components. The module may also include a sheath or housing for containing the inflatable curtain in a stored condition and mounting hardware for connecting the module to the vehicle.

The size of the module can be relatively large, having, for example, a length that stretches the full length of the vehicle occupant compartment. A special shipping container may be required to transport the module to the vehicle manufacturer. Reducing the size of the module for shipping may enable the use of a standard, less expensive shipping container.

Additionally, the size of the module may present difficulties in positioning the module for installation in the vehicle occupant compartment. Improving the module's maneuverability in the vehicle may simplify or reduce the difficulties encountered in installing the module in the vehicle.

SUMMARY OF THE INVENTION

The present invention relates to an apparatus for helping to protect an occupant of a vehicle. The apparatus includes at least one inflatable vehicle occupant protection device including a first portion inflatable to cover a first portion of a vehicle and a second portion inflatable to cover a second portion of a vehicle. A single inflator provides inflation fluid to inflate the protection device. A first conduit has a portion terminating in the first portion of the protection device. A second conduit has a portion terminating in the second portion of the protection device. The first and second conduits are adapted to move relative to each other from a first condition in which the conduits are positioned for installation in the vehicle to a second condition in which the conduits are positioned next to each other.

The present invention also relates to an apparatus for helping to protect an occupant of a vehicle. The apparatus includes a first conduit for delivering inflation fluid to a driver side inflatable vehicle occupant protection device. The apparatus also includes a second conduit for delivering inflation fluid to a passenger side inflatable vehicle occupant protection device. The apparatus further includes means for providing fluid communication between the first and second conduits and an inflation fluid source. The first and second conduits and the means for providing fluid communication are interconnected to form an assemblage. The first and second conduits while in the assemblage are movable relative to each other to place the assemblage in an installation condition in which the first and second conduits are positioned for installation in the vehicle. The first and second conduits are movable relative to each other to place the assemblage in a second condition in which the first and second conduits are positioned next to each other.

The present invention further relates to an apparatus for helping to protect an occupant of a vehicle. The apparatus includes a driver side protection module, a passenger side protection module, and a single inflator. The apparatus also includes an inflation fluid distribution assembly for directing inflation fluid from the single inflator to the driver side protection module and passenger side protection module. The driver side protection module, passenger side protection module, single inflator, and inflation fluid distribution assembly are interconnected to form an assemblage in which the driver side protection module and passenger side protection module are movable relative to each other. The assemblage has an installation condition in which the driver side protection module is positioned for installation along the driver side of the vehicle and the passenger side protection module is positioned for installation along the passenger side of the vehicle. The assemblage has a second condition in which the driver side protection module and the passenger side protection module are positioned next to each other.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic top view of an apparatus for helping to protect an occupant of a vehicle illustrating an installation condition of the apparatus in a vehicle, according to a first embodiment of the invention;

FIG. 2 is a schematic side view of the apparatus of FIG. 1, illustrating the apparatus in a stored condition and in a deployed condition;

FIG. 3 is a schematic top view of the apparatus of FIG. 1, illustrating the apparatus in a shipping condition;

FIG. 4 is a schematic top view illustrating an alternative configuration of a portion of the apparatus of FIGS. 1-3;

FIG. 5 is a schematic top view of an apparatus for helping to protect an occupant of a vehicle, illustrating an installation condition of the apparatus, according to a second embodiment of the invention;

FIG. 6 is a schematic top view of the apparatus of FIG. 5, illustrating the apparatus in a shipping condition;

FIG. 7 is a schematic top view illustrating an alternative configuration of the apparatus of FIGS. 5 and 6 in an installation condition, according to a third embodiment of the invention;

FIG. 8 is a schematic top view of the apparatus of FIG. 7 in a shipping condition;

FIG. 9 is a schematic top view of an apparatus for helping to protect an occupant of a vehicle, illustrating an installation condition of the apparatus, according to a fourth embodiment of the invention;

FIG. 10 is a schematic view of the apparatus of FIG. 9, illustrating the apparatus in a shipping condition;

FIG. 11 is a schematic top view of an apparatus for helping to protect an occupant of a vehicle, illustrating an installation condition of the apparatus, according to a fifth embodiment of the invention;

FIG. 12 is a schematic view of the apparatus of FIG. 11, illustrating the apparatus in a shipping condition;

FIG. 13 is a schematic top view of an apparatus for helping to protect an occupant of a vehicle, illustrating an installation condition of the apparatus, according to a sixth embodiment of the invention;

FIG. 14 is a schematic view of the apparatus of FIG. 13, illustrating the apparatus in a shipping condition;

FIG. 15 is a schematic top view of an apparatus for helping to protect an occupant of a vehicle having front and rear passenger seating, according to a seventh embodiment of the invention; and FIGS. 16A-16C are schematic perspective views of installation brackets that may be used to secure any of the embodiments of FIGS. 1-15 in a vehicle.

DETAILED DESCRIPTION OF THE INVENTION

FIGS. 1 and 2 illustrate an apparatus 10 for helping to protect an occupant (not shown) of a vehicle 12. The apparatus 10 includes an inflatable vehicle occupant protection device 14. The protection device 14 has a stored condition shown in FIG. 1 and illustrated at 14 in FIG. 2. The protection device 14 is inflatable to a deployed condition illustrated at 14' in FIG. 2.

The inflatable vehicle occupant protection device 14 includes a driver side portion 50 inflatable to cover a portion of a side structure 20 on a driver side 22 of the vehicle 12. The inflatable vehicle occupant protection device 14 includes a passenger side portion 60 (FIG. 1) inflatable to cover a portion of a side structure 30 on a passenger side 32 of the vehicle 12. The driver side portion 50 may comprise an inflatable driver side curtain and the passenger side portion 60 may comprise an inflatable passenger side curtain.

The driver side curtain 50 has a stored condition in which the curtain is rolled, folded, or both rolled and folded, and is positioned extending along an intersection of the side structure 20 and a roof 24 of the vehicle 12 on the driver side 22 of the vehicle. The passenger side curtain 60 has a stored condition in which the curtain is rolled, folded, or both rolled and folded, and is positioned extending along an intersection of the side structure 30 and the roof 24 of the vehicle 12 on the passenger side 32 of the vehicle.

The inflatable curtains 50 and 60 may have any suitable construction. For example, the curtains 50 and 60 may include panels of material that are arranged in an overlying manner with portions of the panels secured together. The panels may be secured together along at least a portion of a perimeter of the inflatable curtains 50 and 60 to form perimeter connections of the curtains. The perimeter connection helps define an inflatable volume of each of the inflatable curtains 50 and 60. The perimeter connection may be formed in a variety of manners, such as by weaving the panels as a single piece of material, stitching the panels together, or interconnecting the panels by ultrasonic welding, heat bonding, or adhesives.

The inflatable curtains 50 and 60 may also include interior connections in which the overlying panels are secured together within the perimeter of the curtains. The interior connections form non-inflatable portions of the inflatable curtains 50 and 60 within the perimeter of the curtain. The interior connections may also help define inflatable chambers of the inflatable curtains 50 and 60. The configuration of the interior connections, and thus the chambers, may vary depending on a variety of factors, such as the architecture of the vehicle 12, the positions of the inflatable curtains 50 and 60 in the vehicle, and the desired extent or coverage of the curtains.

The panels used to construct the curtains 50 and 60 may be woven from a material, such as nylon yarn, and may be coated with a gas impermeable material, such as urethane, or laminated with a gas impermeable film. The inflatable curtains 50 and 60 thus may have a substantially gas-tight construction. Those skilled in the art will appreciate that alternative materials, such as polyester yarn, and alternatives coatings, such as silicone, may also be used to construct the inflatable curtains 50 and 60.

The apparatus 10 also includes an inflation fluid source 70 for providing inflation fluid for inflating the driver side curtain 50 and passenger side curtain 60. As shown in FIG. 1, the inflation fluid source 70 may comprise a single inflator for providing inflation fluid to both curtains 50 and 60.

The apparatus 10 includes a driver side conduit 52, such as a fill tube, for delivering inflation fluid into the driver side curtain 50. The apparatus 10 also includes a passenger side conduit 62, such as a fill tube, for delivering inflation fluid into the passenger side curtain 60. The conduits 52 and 62 may have any suitable configuration and may be constructed of any suitable material, such as metal, plastic, rubber, fabric, or a combination of these materials. For example, the conduits 52 and 62 may comprise a steel conduit, a plastic conduit, or a nylon fabric conduit. As another example, the conduits 52 and 62 may comprise a rubber conduit covered with a braided metal sheath. As another example, the conduits 52 and 62 may comprise a steel-reinforced rubber conduit.

The inflator 70 may contain a stored quantity of pressurized inflation fluid (not shown) in the form of a gas for inflating the inflatable curtains 50 and 60. The inflator 70 alternatively could contain a combination of pressurized inflation fluid and ignitable material for heating the inflation fluid, or could be a pyrotechnic inflator that uses the combustion of gas-generating material to generate inflation fluid. As a further alternative, the inflator 70 could be of any suitable type or construction for supplying a medium for inflating the inflatable curtains 50 and 60.

The apparatus 10 may also include a housing 54 for helping to support the driver side curtain 50 in the stored condition. The apparatus 10 may also include a housing 64 for helping to support the passenger side curtain 60 in the stored condition. The housings 54 and 64 may have any suitable configuration and may be constructed of any suitable material, such as plastic or fabric.

The apparatus 10 also includes an inflation fluid distribution assembly 80 for connecting the driver conduit tube 52 and passenger side conduit 62 in fluid communication with the inflator 70. The fluid distribution assembly 80, when installed, is positioned extending along the intersection of a rear structure 40 of the vehicle 12 and the vehicle roof 24. In the embodiment illustrated in FIGS. 1-3, the fluid distribution assembly 80 includes a distribution conduit 82 connected in fluid communication with the inflator 70 via suitable means, such as a T-fitting 84. The distribution conduit 82 has a driver side portion 90 that is connected in fluid communication with the driver side conduit 52 via a fitting 92 and a passenger side portion 94 connected in fluid communication with the passenger side conduit 62 via a fitting 96.

The distribution conduit 82 may have any suitable configuration, such as a single piece configuration or a configuration in which multiple pieces are interconnected with each other. The distribution conduit 82 may also have any suitable material construction, such as metal, plastic, rubber, fabric, or a combination of these materials.

The vehicle 12 includes a sensor mechanism 110 (shown schematically in FIGS. 1 and 2) for sensing a side impact to the vehicle 12 and/or a rollover of the vehicle. The sensor mechanism 110 actuates the inflator 70 in response to sensing a side impact or a vehicle rollover. In the event of a rollover of the vehicle 12 or a side impact to the vehicle for which inflation of the inflatable curtains 50 and 60 is desired, the sensor mechanism 110 provides an electrical signal over lead wires 112 to the inflator 70. The electrical signal causes the inflator 70 to be actuated in a known manner. The inflator 70 discharges fluid under pressure into the fluid distribution assembly 80, which directs the fluid into the driver side and passenger side conduits 52 and 62 and into the inflatable curtains 50 and 60.

The driver side and passenger side inflatable curtains 50 and 60 inflate under the pressure of the inflation fluid from the inflator 70. The housings 54 and 64 open and the curtains 50 and 60 inflate and deploy in a direction away from the roof 24 in a downward direction as viewed in FIG. 2 and in a downward direction with respect to the direction of forward travel of the vehicle 12 into the inflated condition illustrated at 14' in FIG. 2.

The driver side curtain 50, when inflated, extends along the side structure 20 on the driver side 22 of the vehicle 12. The driver side curtain 50 is positioned between the side structure 20 and any occupant of the vehicle 12. The passenger side curtain 60, when inflated, extends along the side structure 30 on the passenger side 32 of the vehicle 12. The passenger side curtain 60 is positioned between the side structure 30 and any occupant of the vehicle 12. The driver side curtain 50 and passenger side curtain 60, when inflated, help protect occupants of the vehicle 12 upon the occurrence of a side impact to the vehicle, a vehicle rollover, or both.

In the embodiment of FIGS. 1 and 2, the inflatable curtains 50 and 60, conduits 52 and 62, housings 54 and 64, inflator 70, and fluid distribution assembly 80 are interconnected to form an assemblage in the form of a curtain module 100 that may be installed in the vehicle 12 as a single unit. The curtain module 100 includes a driver side module 102 that includes the driver side conduit 52, the driver side curtain 50, and the driver side housing 54. The curtain module 100 includes a passenger side module 104 that includes the passenger side conduit 62, the passenger side curtain 60, and the passenger side housing 64.

According to the present invention, the curtain module 100 is configured such that the driver side conduit 52 and passenger side conduit 62, when interconnected to form the curtain module 100, are movable relative to each other. The driver side module 102 and passenger side module 104 are thus movable relative to each other. In this configuration, the conduits 52 and 62 are collapsible, foldable, or otherwise movable to place the curtain module 100 in an installation condition, as shown in FIGS. 1 and 2, or a shipping condition, as shown in FIG. 3.

Movement of the driver side module 102 and passenger side module 104 relative to each other and relative to the remainder of the curtain module 100 is made possible through the configuration of the fluid distribution assembly 80. In the embodiment of FIGS. 1-3, this is achieved through the construction of the fittings 92 and 96. The fitting 92 has a flexible construction, which permits the driver side conduit 52 to pivot or otherwise move relative to the passenger side conduit 62 and the other portions of the curtain module 100. The fitting 92 thus permits the driver side module 102 to pivot or otherwise move relative to the passenger side module 104 and the other portions of the curtain module 100. Similarly, the fitting 96 has a flexible construction, which permits the passenger side conduit 62 to pivot or otherwise move relative to the driver side conduit 52 and the other portions of the curtain module 100. The fitting 96 thus permits the passenger side module 104 to pivot or otherwise move relative to the driver side module 102 and the other portions of the curtain module 100.

As best shown by comparing the installation and shipping conditions of FIGS. 1 and 3, respectively, the fittings 92 and 96 may permit a substantial degree of relative movement between the driver side module 102, passenger side module 104 and fluid distribution assembly 80. For example, the fitting 92 may permit relative movement of the driver side module 102 and the fluid distribution assembly 80 of up to 75 degrees or more. The fitting 96 may permit relative movement of the passenger side module 104 and the fluid distribution assembly 80 of up to 75 degrees or more. As shown in FIGS. 1 and 3, the fittings 92 and 96 permit the driver side module 102 and passenger side module 104, respectively, to move through an angle of about 90 degrees.

The fittings 92 and 96 may have a variety of constructions suited to permit the desired relative movement. For example, the fittings 92 and 96 may comprise a sleeve formed from an elastomeric material, such as rubber. The elastomeric sleeve may be encased in a material, such as a braided fabric or metal, to help protect or reinforce the sleeve. In this configuration, the fittings 92 and 96 may include means (not shown), such as hose clamps, for connecting the sleeves to the driver side conduit 52, passenger side conduit 62, and distribution conduit 82. Also, in this configuration, the sleeves of the fittings 92 and 96 may bend, flex, or otherwise deflect to permit relative movement between the driver side module 102, passenger side module 104 and fluid distribution assembly 80.

In another configuration, the fittings 92 and 96 may comprise couplings connectable to the driver side conduit 52, passenger side conduit 62, and distribution conduit 82 by means, such as screw threads or welding. The fittings 92 and 96 may have parts that are pivotal or rotational relative to each other to permit relative movement between the driver side module 102, passenger side module 104 and fluid distribution assembly 80. In a further configuration, the fittings 92 and 96 may have any configuration suited to connect with the driver side conduit 52, passenger side conduit 62, and distribution conduit 82 and provide relative movement between the driver side module 102, passenger side module 104 and fluid distribution assembly 80.

In the installation condition of the curtain module 100 shown in FIGS. 1 and 2, the driver side conduit 52 may be positioned for installation at the driver side 22 of the vehicle 12 while the passenger side conduit 62 may be positioned for installation at the passenger side 32 of the vehicle. The installation positions of the driver side module 102 and passenger side module 104 may be achieved simultaneously. The driver side module 102 may thus be positioned extending along the intersection of the side structure 20 and the vehicle roof 24 on the driver side 22 of the vehicle 12. The passenger module 104 may thus be positioned extending along the intersection of the side structure 30 and the vehicle roof 24 on the passenger side 32 of the vehicle 12.

As shown in FIG. 1, in the installation condition of the curtain module 100, the driver side module 102 and the passenger side module 104 are spaced from each other and extend generally parallel to each other along the opposite side structures 20 and 30 of the vehicle 12. The fluid distribution assembly 80 and inflator 70 are positioned between the driver side module 102 and passenger side module 104 and are connected to the conduits 52 and 62 via the fittings 92 and 96.

In the shipping condition of the curtain module 100 shown in FIG. 3, the driver side module 102 and passenger side module 104 are pivoted or otherwise moved relative to each other and relative to the remainder of the module to the position shown in FIG. 3. When the curtain module 100 is in the shipping condition, the driver side module 102 and passenger side module 104 are positioned next to each other, e.g., in an adjacent and overlying manner. The driver side module 102 and passenger side module 104 may also be positioned next to the remainder of the curtain module 100, i.e., next to the fluid distribution assembly 80, the inflator 70, or both.

The curtain module 100, when in the shipping condition, thus has a relatively small package size and can be readily transported and shipped. The curtain module 100, being movable between the shipping condition and installation condition, can also be readily maneuvered for positioning and installation in the vehicle 12.

FIGS. 1-3 illustrate one particular configuration of the apparatus 10 installed in one particular configuration of the vehicle 12. More specifically, in FIGS. 1-3, the apparatus 10 includes a driver side curtain 50 and a separate passenger side curtain 60 for installation in a single cab pickup truck. Those skilled in the art will appreciate that the apparatus 10, the vehicle 12, or both, could have alternative configurations.

For example, the apparatus 10 may be installed in an alternative vehicle (not shown), such as an extended cab or crew cab pickup truck, a sport utility vehicle (SUV), minivan, or a conventional automobile, such as a coupe, sedan, or sports car. In these alternative installations, the configuration of the apparatus 10 may be adapted to conform with the configuration or architecture of the particular vehicle in which the apparatus is installed.

As another example, the apparatus 10 may have the alternative configuration of FIG. 4. As shown in FIG. 4, the apparatus 10 may include a single inflatable vehicle occupant protection device, such as an inflatable curtain 120. In the configuration of FIG. 4, the inflatable curtain 120 includes a driver side portion 122 that is inflatable along the side structure on the driver side of the vehicle (not shown), a passenger side portion 124 that is inflatable along the side structure on the passenger side of the vehicle, and a rear portion 126 that is inflatable along the rear structure 40 of the vehicle.

A single housing 128 may house the driver side portion 122, passenger side portion 124, and rear potion 126 in the stored condition. As an alternative, the driver side portion 122, passenger side portion 124, and rear portion 126 could be separate inflatable vehicle occupant protection devices. In this instance, separate housings may house the driver side portion 122, passenger side portion 124, and rear portion 126 in the stored condition.

In the configuration of FIG. 4, the distribution conduit 82 delivers inflation fluid to the rear portion 126 to inflate the rear portion. The distribution conduit 82 also delivers inflation fluid to the driver side conduit 52 via the fitting 92 and to the passenger side conduit 62 via the fitting 96.

A second embodiment of the present invention is illustrated in FIGS. 5 and 6. The second embodiment of the invention is similar to the first embodiment of the invention illustrated in FIGS. 1-3. Accordingly, numerals similar to those of FIGS. 1-3 will be utilized in FIGS. 5 and 6 to identify similar components, the suffix letter "a" being associated with the numerals of FIGS. 5 and 6 to avoid confusion.

The apparatus 10a of FIGS. 5 and 6 includes a curtain module 100a that is identical to the embodiment shown in FIGS. 1-3, except that the conduits 52a and 62a extend only partially into the driver side curtain 50a and passenger side curtain 60a, respectively. The conduits 52a and 62a of the second embodiment (FIGS. 5 and 6) are relatively short in comparison with the conduits 52 and 62 of the first embodiment (FIGS. 1-3). The conduits 52 and 62 (FIGS. 1-3) extend along a substantial portion of the length of the driver side module 102 and passenger side module 104, respectively, whereas the conduits 52a and 62a (FIGS. 5 and 6) extend only partially into the driver side module 102a and passenger side module 104a, respectively.

In the embodiment of FIGS. 5 and 6, the fluid distribution assembly 80a includes fittings 92a and 96a for connecting the conduits 52a and 62a to the distribution conduit 82a. The conduits 52a and 62a are thus movable relative to the fluid distribution assembly 80a from the installation condition of FIG. 5 to the shipping condition of FIG. 6. In the shipping condition, the driver side module 102a and passenger side module 104a are positioned next to each other, e.g., in an adjacent and overlying relationship.

The curtain module 100a, when in the shipping condition, thus has a relatively small package size and can be readily transported and shipped. The curtain module 100a, being movable between the shipping condition and installation condition, can also be readily maneuvered for positioning and installation in the vehicle.

A third embodiment of the present invention is illustrated in FIGS. 7 and 8. The third embodiment of the invention is similar to the second embodiment of the invention illustrated in FIGS. 5 and 6. Accordingly, numerals similar to those of FIGS. 5 and 6 will be utilized in FIGS. 7 and 8 to identify similar components, the suffix letter "b" being associated with the numerals of FIGS. 7 and 8 to avoid confusion.

In the embodiment of FIGS. 7 and 8, the apparatus 10b includes a driver side module 102b and passenger side module 104b that have what is sometimes referred to as a "soft pack" configuration. In the soft pack configuration, the housings 54b and 64b used to house the driver side and passenger side curtains 50b and 60b, respectively, have a fabric construction.

The apparatus 10b also has the short driver side conduit 52b and passenger side conduit 62b construction described above in regard to the embodiment of FIGS. 5 and 6. In the embodiment of FIGS. 7 and 8, however, the conduits 52b and 62b have a rigid connection with the distribution conduit 82b of the fluid distribution assembly 80b. For example, the conduits 52b and 62b and the distribution conduit 82b may comprise a single piece of material, such as a metal tube. As shown in FIGS. 7 and 8, the apparatus 10b may include flexible conduits 160 and 162, such as a plastic, rubber, or fabric conduits, that are connected with the rigid conduits 52b and 62b and extend into the curtains 50b and 60b of the driver side module 102b and passenger side module 104b, respectively.

The fabric construction of the curtains 50b and 60b, housings 54b and 64b, and flexible conduits 160 and 162, coupled with the relatively short length of the rigid conduits 52b and 62b, allows portions of the driver side module 102b and passenger side module 104b to be bent or folded, as shown in FIG. 8. This enables the driver side and passenger side modules 102b and 104b to move relative to each other and relative to the remainder of the curtain module 100b. The curtain module 100b may thus move from the installation condition of FIG. 7 to the shipping condition of FIG. 8. In the shipping condition, the driver side module 102b and passenger side module 104b are positioned next to each other, e.g., in an adjacent and overlying relationship.

The curtain module 100b, when in the shipping condition, thus has a relatively small package size and can be readily transported and shipped. The curtain module 100b, being movable between the shipping condition and installation condition, can also be readily maneuvered for positioning and installation in the vehicle.

A fourth embodiment of the present invention is illustrated in FIGS. 9 and 10. The fourth embodiment of the invention is similar to the first embodiment of the invention illustrated in FIGS. 1-3. Accordingly, numerals similar to those of FIGS. 1-3 will be utilized in FIGS. 9 and 10 to identify similar components, the suffix letter "c" being associated with the numerals of FIGS. 9 and 10 to avoid confusion.

In the embodiment of FIGS. 9 and 10, the apparatus 10c includes a curtain module 100c comprising a driver side module 102c and a passenger side module 104c. The driver side module 102c includes a driver side curtain 50c, conduit 52c and housing 54c. The driver side conduit 52c has the "long" configuration, similar to that of FIGS. 1-3, extending along a substantial portion of the length of the driver side module 102c. The passenger side module 104c includes a passenger side curtain 60c, conduit 62c and housing 64c. The passenger side conduit 62c has the "long" configuration, similar to that of FIGS. 1-3, extending along a substantial portion of the length of the passenger side module 104c.

In the embodiment of FIGS. 9 and 10, the conduits 52c and 62c have a rigid connection with the distribution conduit 82c of the fluid distribution assembly 80c. More particularly, the driver side conduit 52c has a rigid connection with the driver side portion 90c of the distribution conduit 82c and the passenger side conduit 62c has a rigid connection with the passenger side portion 94c of the distribution conduit. For example, the driver side conduit 52c and the driver side portion 90c of the distribution conduit 82c may comprise a single piece of material, such as a metal tube. Similarly, the passenger side conduit 62c and the passenger side portion 94c of the distribution conduit 82c may comprise a single piece of material, such as a metal tube.

The fluid distribution assembly 80c of the apparatus 10c of FIGS. 9 and 10 includes a fitting 150 for providing fluid communication between the inflator 70c, the driver side module 102c, and the passenger side module 104c via the distribution conduit 82c. The fitting 150 includes a first portion 152 for providing fluid communication between the inflator 70c and the driver side module 102c via the driver side portion 90c of the distribution conduit 82c. The fitting 150 also includes a second portion 154 for providing fluid communication between the inflator 70c and the passenger side module 104c via the passenger side portion 94c of the distribution conduit 82c.

The first and second portions 152 and 154 of the fitting 150 are connected in fluid communication with each other and are connected for rotational movement relative to each other about an axis 156. The driver side module 102c and the driver side portion 90c of the distribution conduit 82c can thus move about the axis 156 relative to the passenger side module 104c and the passenger side portion 94c of the distribution conduit 82c. This allows the curtain module 100c to move from the installation condition of FIG. 9 to the shipping condition of FIG. 10.

In the shipping condition, the driver side module 102c and passenger side module 104c are positioned next to each other, e.g., in an adjacent and overlying relationship. As shown in FIG. 10, the driver side module 102c and driver side portion 90c of the distribution conduit 82c have a configuration that follows the shape or contour of the passenger side module 104c and passenger side portion 94c of the distribution conduit. Thus, in the shipping condition of the curtain module 100c, the driver side module 102c and passenger side module 104c are nested next to each other.

The curtain module 100c, when in the shipping condition, thus has a relatively small package size and can be readily transported and shipped. The curtain module 100c, being movable between the shipping condition and installation condition, can also be readily maneuvered for positioning and installation in the vehicle.

A fifth embodiment of the present invention is illustrated in FIGS. 11 and 12. The fifth embodiment of the invention is similar to the first embodiment of the invention illustrated in FIGS. 1-3. Accordingly, numerals similar to those of FIGS. 1-3 will be utilized in FIGS. 11 and 12 to identify similar components, the suffix letter "d" being associated with the numerals of FIGS. 11 and 12 to avoid confusion.

In the embodiment of FIGS. 11 and 12, the apparatus 10d includes a curtain module 100d comprising a driver side module 102d and a passenger side module 104d. The driver side module 102d includes a driver side curtain 50d, conduit 52d and housing 54d. The driver side conduit 52d has the "long" configuration, similar to that of FIGS. 1-3, extending along a substantial portion of the length of the driver side module 102d. The passenger side module 104d includes a passenger side curtain 60d, conduit 62d and housing 64d. The passenger side conduit 62d has the "long" configuration, similar to that of FIGS. 1-3, extending along a substantial portion of the length of the passenger side module 104d. The driver side conduit 52d and passenger side conduit 62d could, however, have alternative configurations in which the conduits extend along portions of the modules 102d and 104d, respectively, having shorter lengths.

In the embodiment of FIGS. 11 and 12, the driver side conduit 52d and passenger side conduit 62d may have any suitable construction. For example, the conduits 52d and 62d may be constructed of metal, plastic, rubber, fabric, or a combination of these materials.

The apparatus 10d also includes a distribution assembly 80d that includes a distribution conduit 82d including a driver side portion 90d and a passenger side portion 94d. According to the embodiment of FIGS. 11 and 12, the gas distribution conduit 82d has a flexible construction. For example, the gas distribution conduit 82d may be constructed of flexible plastic, rubber, or fabric. In one example construction, the gas distribution conduit 82d may be constructed of a rubber tube positioned within a braided metal sheath. In another example construction, the gas distribution conduit 82d may be constructed of a steel-reinforced rubber tube. In a further example configuration, the gas distribution conduit 82d may be constructed of a woven nylon tube, coated or uncoated.

The driver side conduit 52d and passenger side conduit 62d are connected in fluid communication with the distribution conduit 82d. More particularly, the driver side conduit 52d is connected in fluid communication with the driver side portion 90d of the distribution conduit 82d and the passenger side conduit 62d is connected in fluid communication with the passenger side portion 94d of the distribution conduit. In an example configuration, the driver side conduit 52d and the driver side portion 90d of the distribution conduit 82d may comprise a single flexible conduit. Similarly, the passenger side conduit 62d and the passenger side portion 94d of the distribution conduit 82d may comprise a single flexible conduit.

The flexible construction of the gas distribution conduit 82d allows the curtain module 100d to move from the installation condition of FIG. 11 to the shipping condition of FIG. 12. As shown in FIG. 12, the flexible gas distribution conduit 82d may be bent, folded, or otherwise deflected to allow the curtain modules 102d and 104d to move to the shipping condition. In the shipping condition, the driver side module 102d and passenger side module 104d are positioned next to each other, e.g., in an adjacent and overlying relationship.

The curtain module 100d, when in the shipping condition, thus has a relatively small package size and can be readily transported and shipped. The curtain module 100d, being movable between the shipping condition and installation condition, can also be readily maneuvered for positioning and installation in the vehicle.

A sixth embodiment of the present invention is illustrated in FIGS. 13 and 14. The sixth embodiment of the invention is similar to the first embodiment of the invention illustrated in FIGS. 1-3. Accordingly, numerals similar to those of FIGS. 1-3 will be utilized in FIGS. 13 and 14 to identify similar components, the suffix letter "e" being associated with the numerals of FIGS. 13 and 14 to avoid confusion.

In the embodiment of FIGS. 13 and 14, the apparatus 10e includes a curtain module 100e comprising a driver side module 102e and a passenger side module 104e. The driver side module 102e includes a driver side curtain 50e, conduit 52e and housing 54e. The driver side conduit 52e has the "long" configuration, similar to that of FIGS. 1-3, extending along a substantial portion of the length of the driver side module 102e. The passenger side module 104e includes a passenger side curtain 60e, conduit 62e and housing 64e. The passenger side conduit 62e has the "long" configuration, similar to that of FIGS. 1-3, extending along a substantial portion of the length of the passenger side module 104e. The driver side conduit 52e and passenger side conduit 62e could, however, have alternative configurations in which the conduits extend along portions of the modules 102e and 104e, respectively, having shorter lengths.

In the embodiment of FIGS. 13 and 14, the driver side module 102e and passenger side module 104e are at least partially integrated into a vehicle headliner 170. For example, the housings 54e and 64e may comprise a spaced defined between respective portions of overlying layers of the headliner 170.

In the embodiment of FIGS. 13 and 14, the driver side conduit 52e and passenger side conduit 62e may have any suitable construction. For example, the conduits 52e and 62e may be constructed of metal, plastic, rubber, fabric, or a combination of these materials. As another example, the driver side conduit 52e and passenger side conduit 62e may be integrated into a layer or substrate of the headliner 170.

The apparatus 10e also includes a distribution assembly 80e that includes a distribution conduit 82e including a driver side portion 90e and a passenger side portion 94e. According to the embodiment of FIGS. 13 and 14, the gas distribution conduit 82e may have a rigid or flexible construction. For example, the gas distribution conduit 82e may be constructed of a rigid metal or plastic. As another example, the gas distribution conduit 82e may be constructed of a flexible plastic, rubber, or fabric.

The apparatus 10e of FIGS. 13 and 14 also includes couplings 180 for connecting the driver side conduit 52e and passenger side conduit 62e in fluid communication with the distribution conduit 82e. More particularly, one coupling 180 includes a first coupling piece 182 associated with the driver side conduit 52e and a second coupling piece 184 associated with the driver side portion 90e of the gas distribution conduit 82e. Another coupling 180 includes a first coupling piece 186 associated with the passenger side conduit 62e and a second coupling piece 188 associated with the passenger side portion 94e of the gas distribution conduit 82e.

The couplings 180 may have any construction suited to provide the desired coupling effect. For example, the couplings 180 may be quick disconnect couplings, which may be coupled and de-coupled without the use of tools. Alternatively, the couplings 180 may be couplings in which screw threads on the mating coupling pieces are used to provide the connection.

In the embodiment illustrated in FIGS. 13 and 14, the driver side portion 90e and passenger side portion 94e of the gas distribution conduit 82e have a generally rigid construction, such as a rigid metal or plastic construction. The driver side portion 90e and passenger side portion 94e are connected in fluid communication with the inflator 70e via fittings 92e and 96e, respectively. The fittings 92e and 96e allow the driver side portion and passenger side portion 94e to move relative to each other and relative to the remainder of the gas distribution assembly 80e.

In FIGS. 13 and 14, the fittings 92e and 96e are flexible sleeves configured to provide the desired relative movement. As an alternative, the fittings 92e and 96e could have any configuration suited to provide the desired relative movement. As another alternative, the driver side portion 90e and passenger side portion 94e of the gas distribution conduit 82e could have a generally flexible construction that provides the desired relative movement.

The apparatus 10e, having this configuration, allows the gas distribution assembly 80e to move from the installation condition of FIG. 13 to the shipping condition of FIG. 14. As shown in FIG. 14, when the gas distribution assembly 80e is in the shipping condition, the driver side portion 90e and passenger side portion 94e are positioned next to each other, e.g., in an adjacent and overlying relationship.

The gas distribution assembly 80e, when in the shipping condition, thus has a relatively small package size and can be readily transported and shipped. The gas distribution assembly 80e, being movable between the shipping condition and installation condition, can also be readily maneuvered for positioning and installation in the on the headliner 170, inside or outside the vehicle.

To connect the driver side portion 90e of the gas distribution assembly 80e to the driver side conduit 52e, the first coupling piece 182 is coupled to the second coupling piece 184. To connect the passenger side portion 94e of the gas distribution assembly 80e to the passenger side conduit 62e, the first coupling piece 186 is coupled to the second coupling piece 188. In the example where the couplings 180 are quick disconnect couplings, their respective portions may be coupled without the use of tools.

A seventh embodiment of the present invention is illustrated in FIG. 15. The seventh embodiment of the invention is similar to the first embodiment of the invention illustrated in FIGS. 1-3. Accordingly, numerals similar to those of FIGS. 1-3 will be utilized in FIG. 15 to identify similar components, the suffix letter "f" being associated with the numerals of FIG. 15 to avoid confusion.

Referring to FIG. 15, the apparatus 10f includes a curtain module 100f comprising a driver side module 102f and a passenger side module 104f. The driver side module 102f includes a driver side curtain 50f, conduit 52f and housing 54f. The passenger side module 104f includes a passenger side curtain 60f, conduit 62f and housing 64f. In the embodiment of FIG. 15, the vehicle 12f includes first row seating 200 and second row seating 202. According to the embodiment of FIG. 15, the curtain module 100f is adapted to help protect occupants (not shown) of the first and second row seating 200 and 202.

The driver side module 102f and passenger side module 104f are configured to extend along their respective side structures 20f and 30f from adjacent the first row seating 200 to adjacent the second row seating 202. For example, as shown in FIG. 15, the driver side and passenger side modules 102f and 104f may be configured to extend from adjacent or near the A pillar 210 to adjacent or near the C pillar 212 on the driver and passenger sides 20f and 30f of the vehicle 12f, respectively. The modules 102f and 104f may thus overlie portions of the A pillar 210, C pillar 212, and B pillar 214 on their respective sides 20f and 30f of the vehicle 12f.

In the embodiment of FIG. 15, the curtain module 100f has a configuration similar to that of FIGS. 1-3. The curtain module 100f could, however, have any of the configurations illustrated in the embodiments of FIGS. 1-14, except that the modules constructed in accordance with the seventh embodiment are adapted to cover portions of the vehicle 12f adjacent the first and second row seating 200 and 202. The curtain module 100f may thus have a construction similar or identical to any of the embodiments of FIGS. 1-14, except for the differences resulting from the module being configured to cover the first and second row seating 200 and 202. The curtain module 100f is adapted to move from a folded shipping condition to an unfolded installation condition in manners similar or identical to those illustrated and described in regard to the embodiment of FIGS. 1-14.

In the embodiment of FIG. 15, the distribution assembly 80f and the inflator 70f are secured to the vehicle 12f along a front roof header 220 of the vehicle. Alternatively, as shown in dashed lines, the distribution assembly 80f' and inflator 70f' could be secured along a rear roof header 222 of the vehicle 12f.

FIGS. 16A-16C illustrate example configurations for support brackets that may be used to secure the curtain modules of FIGS. 1-15 to a vehicle. Referring to FIG. 16A, an inflator support bracket 250 includes a clamping portion 252 adapted to mate with the shape (e.g., cylindrical) of the inflator 70. The bracket 250 also includes overlying flanges 254 secured together by means 256, such as threaded fasteners, to cause a clamping force to be exerted on the inflator 70 by the clamping portion 252.

The bracket 250 also may include a hook portion 260 that may be insertable into an opening (not shown) in the vehicle to pre-hang or pre-position the bracket and, thus, the inflator 70 and module 100 in the vehicle. The flanges 254 have portions 262 adapted to receive fasteners 264, such as bolts, that are used to secure the bracket 250 and, thus, the inflator 70 and curtain module 100 to the vehicle.

Referring to FIG. 16B, a soft pack support bracket 270 has overlying plate portions 272 folded over onto a fabric tab 274 of a soft pack fabric sheath 276 of the curtain module 100 at a location where no fill tube is present. The plate portions 272 include pin portions 280 adapted to extend through corresponding apertures in the tab 274 to help secure the support bracket 270 to the tab. When the support bracket 270 is secured to the tab 274, overlying central openings 282 in the plate portions 272 coincide with an opening in the tab 274.

The bracket 270 also may include a hook portion 284 that may be insertable into an opening (not shown) in the vehicle to pre-hang or pre-position the bracket and, thus, the module 100 in the vehicle. The openings 280 in the plate portions 272 are adapted to receive one or more fasteners (not shown), such as bolts, that are used to secure the bracket 270 and, thus, the curtain module 100 to the vehicle.

Referring to FIG. 16C, a conduit support bracket 290 includes a clamping portion 292 adapted to mate with the inflation fluid delivery conduits of the curtain module 100 (e.g., driver side conduit 52 and passenger side conduit 62). The bracket 290 also includes overlying flanges 294 secured together by means 296, such as threaded fasteners, to cause a clamping force to be exerted on the conduit by the clamping portion 292.

The bracket 290 also may include a hook portion 300 that may be insertable into an opening (not shown) in the vehicle to pre-hang or pre-position the bracket and, thus, the conduit and module 100 in the vehicle. The flanges 294 have portions 302 adapted to receive one or more fasteners (not shown), such as bolts, that are used to secure the bracket 290 and, thus, conduit and curtain module 100 to the vehicle.

From the above description of the invention, those skilled in the art will perceive improvements, changes and modifications. Such improvements, changes and modifications within the skill of the art are intended to be covered by the appended claims.

Having described the invention, we claim the following:

1. An apparatus for helping to protect an occupant of a vehicle, said apparatus comprising:
    at least one inflatable vehicle occupant protection device having a first portion inflatable to cover a first portion of a vehicle side structure and a second portion inflatable to cover a second portion of a vehicle side structure;
    a single inflator for providing inflation fluid to inflate said at least one inflatable vehicle occupant protection device;
    a first conduit having a portion terminating in said first portion of said inflatable vehicle occupant protection device;
    a second conduit having a portion terminating in said second portion of said inflatable vehicle occupant protection device; and
    at least one fitting having portions that move relative to each other to permit said first and second conduits to move relative to each other from a first condition in which said first and second conduits are positioned for installation in the vehicle to a second condition in which said first and second conduits are positioned next to each other;
    wherein said first conduit enters a rear portion of said first portion of said inflatable vehicle occupant protection device and terminates in said rear portion of said first portion of said inflatable vehicle occupant protection device; and
    said second conduit enters a rear portion of said second portion of said inflatable vehicle occupant protection device and terminates in said rear portion of said second portion of said inflatable vehicle occupant protection device.

2. The apparatus recited in claim 1, wherein said first portion is inflatable to cover a portion of a vehicle side structure on a driver side of the vehicle and said second portion is inflatable to cover a portion of a vehicle side structure on a passenger side of the vehicle.

3. The apparatus recited in claim 1, wherein said first portion comprises a driver side inflatable curtain that is inflatable to cover a portion of a vehicle side structure on a driver side of the vehicle and said second portion comprises a passenger side inflatable curtain that is inflatable to cover a portion of a vehicle side structure on a passenger side of the vehicle.

4. The apparatus recited in claim 1, wherein said at least one inflatable vehicle occupant protection device comprises:
a driver side inflatable curtain comprising said first portion, said driver side inflatable curtain being inflatable to cover a portion of a vehicle side structure on a driver side of the vehicle; and
a passenger side inflatable curtain comprising said second portion, said passenger side inflatable curtain being inflatable to cover a portion of a vehicle side structure on a passenger side of the vehicle.

5. The apparatus recited in claim 1, wherein said at least one inflatable vehicle occupant protection device comprises a single inflatable curtain in which:
said first portion comprises a driver side portion inflatable to cover a portion of a vehicle side structure on a driver side of the vehicle; and
said second portion comprises a passenger side portion inflatable to cover a portion of a vehicle side structure on a passenger side of the vehicle;
said inflatable curtain further comprising a third portion inflatable to cover a rear structure of the vehicle.

6. The apparatus recited in claim 1, further comprising means for providing fluid communication between said first and second conduits and said inflator.

7. The apparatus recited in claim 6, wherein said means for providing fluid communication comprises a fitting having portions movable relative to each other to permit said first conduit to move relative to said second conduit.

8. The apparatus recited in claim 6, wherein said means for providing fluid communication comprises a flexible joint for permitting said first conduit to move relative to said second conduit.

9. The apparatus recited in claim 8, wherein said flexible joint comprises a hose.

10. The apparatus recited in claim 1, further comprising:
a first housing for storing said first portion of said inflatable vehicle occupant protection device and at least a portion of said first conduit; and
a second housing for storing said second portion of said inflatable vehicle occupant protection device and at least a portion of said second conduit;
said first and second housings moving relative to each other upon movement of said first and second conduits between said first and second conditions.

11. The apparatus recited in claim 1, wherein said first and second conduits when in said second condition have a nested configuration.

12. The apparatus recited in claim 1, wherein at least one of said first and second conduits pivots at least 75 degrees relative to the other of said first and second conduits while moving between said first condition and said second condition.

13. The apparatus recited in claim 1, wherein said first an second conduits comprise rigid tubes substantial portions of which are positioned in said inflatable vehicle occupant protection device, said apparatus further comprising at least one flexible conduit that provides fluid communication between said first conduit and said inflator and between said second conduit and said inflator, said at least one flexible conduit permitting movement of said first and second conduits relative to each other from said first condition to said second condition.

14. The apparatus recited in claim 1, having a portion integrated with a vehicle headliner.

15. The apparatus recited in claim 14, wherein said integrated portion comprises a housing for storing at least a portion of said inflatable vehicle occupant protection device.

16. The apparatus recited in claim 14, wherein said integrated portion comprises a portion of at least one of said first and second conduits.

17. The apparatus recited in claim 1, wherein said first portion is inflatable to cover a portion of a vehicle side structure on a driver side of the vehicle adjacent first and second row seating of the vehicle and said second portion is inflatable to cover a portion of a vehicle side structure on a passenger side of the vehicle adjacent first and second row seating of the vehicle.

18. An apparatus for helping to protect an occupant of a vehicle, said apparatus comprising:
a first conduit for delivering inflation fluid to a driver side inflatable vehicle occupant protection device;
a second conduit for delivering inflation fluid to a passenger side inflatable vehicle occupant protection device; and
means for providing fluid communication between said first and second conduits and an inflation fluid source;
said first and second conduits and said means for providing fluid communication being interconnected to form an assemblage, said first and second conduits while in said assemblage being movable relative to each other to place said assemblage in an installation condition in which said first and second conduits are positioned for installation in the vehicle;
said first and second conduits being movable relative to each other to place said assemblage in a second condition in which said first and second conduits are positioned next to each other.

19. The apparatus recited in claim 18, wherein at least a portion of said first conduit is positioned for installation along a side structure on the driver side of the vehicle and said second conduit simultaneously has at least a portion positioned for installation along a side structure on the passenger side of the vehicle when said assemblage is in said installation condition.

20. The apparatus recited in claim 18, wherein said driver side inflatable vehicle occupant protection device and said passenger side inflatable vehicle occupant protection device are inflatable to help protect occupants of first and second row seating of the vehicle.

21. An apparatus for helping to protect an occupant of a vehicle, said apparatus comprising:
a driver side protection module;
a passenger side protection module;
a single inflator; and
an inflation fluid distribution assembly for directing inflation fluid from said single inflator to said driver side protection module and passenger side protection module;
said driver side protection module, said passenger side protection module, said single inflator, and said inflation fluid distribution assembly being interconnected to form an assemblage in which said driver side protection module and said passenger side protection module are movable relative to each other, said assemblage having an installation condition in which said driver side protection module is positioned for installation along the driver side of the vehicle and said passenger side protection module is positioned for installation along the passenger side of the vehicle, said assemblage having a second condition in which said driver side protection module and said passenger side protection module are positioned next to each other.

22. The apparatus recited in claim 21, wherein:

said driver side protection module comprises a driver side inflatable vehicle occupant protection device and a driver side conduit for delivering inflation fluid to said driver side inflatable vehicle occupant protection device; and said passenger side protection module comprises a passenger side inflatable vehicle occupant protection device and a passenger side conduit for delivering inflation fluid to said passenger side inflatable vehicle occupant protection device.

23. An apparatus for helping to protect an occupant of a vehicle, said apparatus comprising:

a single inflatable curtain comprising:
 a first portion inflatable to cover a portion of a vehicle side structure on a driver side of the vehicle,
 a second portion inflatable to cover a portion of a vehicle side structure on a passenger side of the vehicle; and
 a third portion inflatable to cover a rear structure of the vehicle;

a single inflator for providing inflation fluid to inflate said inflatable curtain;

a first conduit having a portion terminating in said first portion of said inflatable vehicle occupant protection device;

a second conduit having a portion terminating in said second portion of said inflatable vehicle occupant protection device; and at least one fitting that permits said first and second conduits to move relative to each other from a first condition in which said first and second conduits are positioned for installation in the vehicle to a second condition in which said first and second conduits are positioned next to each other.

24. An apparatus for helping to protect an occupant of a vehicle, said apparatus comprising:

a driver side inflatable vehicle occupant protection device inflatable to cover a portion of a driver side vehicle side structure;

a passenger side inflatable vehicle occupant protection device inflatable to cover a portion of a passenger side vehicle side structure;

an inflation fluid source for providing inflation fluid to inflate the driver side protection device and the passenger side protection device; and a rigid conduit for delivering the inflation fluid to the driver side protection device and to the passenger side protection device, the conduit comprising a distribution portion that extends from adjacent the side structure on the driver side of the vehicle to adjacent the side structure on the passenger side of the vehicle, the conduit comprising a first terminal end portion that extends transverse to the distribution portion along the side structure on the driver side of the vehicle and delivers inflation fluid into the driver side protection device, the conduit comprising a second terminal end portion that extends transverse to the distribution portion along the side structure on the passenger side of the vehicle and delivers inflation fluid into the passenger side protection device, the first and second terminal end portions having shortened lengths extending only partially into the driver side and passenger side protection devices so that the protection devices can be folded to positions extending adjacent to each other.

\* \* \* \* \*

UNITED STATES PATENT AND TRADEMARK OFFICE
CERTIFICATE OF CORRECTION

PATENT NO.      : 7,625,005 B2                                                              Page 1 of 1
APPLICATION NO. : 11/214653
DATED           : December 1, 2009
INVENTOR(S)     : Saberan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 872 days.

Signed and Sealed this

Twenty-sixth Day of October, 2010

David J. Kappos
*Director of the United States Patent and Trademark Office*